United States Patent
Suzuki et al.

(10) Patent No.: US 6,717,319 B2
(45) Date of Patent: Apr. 6, 2004

(54) ELECTRIC ROTARY MACHINE WITH ARMATURE OF DISCRETE SALIENT POLE STRUCTURE

(75) Inventors: Yuzuru Suzuki, Shizuoka-ken (JP); Seiichi Matsuura, Shizuoka-ken (JP); Kunitake Matsushita, Shizuoka-ken (JP); Masato Hata, Shizuoka-ken (JP); Sakae Fujitani, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/352,706

(22) Filed: Jan. 28, 2003

(65) Prior Publication Data
US 2003/0141780 A1 Jul. 31, 2003

(30) Foreign Application Priority Data
Jan. 31, 2002 (JP) ........................................ 2002-024362

(51) Int. Cl.⁷ ............................. H02K 1/18; H02K 1/12
(52) U.S. Cl. ..................... 310/218; 310/216; 310/217; 310/254
(58) Field of Search ........................... 310/254, 216–218

(56) References Cited

U.S. PATENT DOCUMENTS

| | | | | |
|---|---|---|---|---|
| 5,949,172 A | * | 9/1999 | Katagiri | 310/218 |
| 6,166,468 A | * | 12/2000 | Suzuki et al. | 310/254 |
| 6,177,751 B1 | * | 1/2001 | Suzuki et al. | 310/218 |
| 6,194,806 B1 | * | 2/2001 | Suzuki et al. | 310/216 |
| 6,359,363 B1 | * | 3/2002 | Foerstera et al. | 310/239 |

FOREIGN PATENT DOCUMENTS

JP   2001-238377   8/2001

* cited by examiner

*Primary Examiner*—Tran Nguyen
*Assistant Examiner*—J. Aguirrechea
(74) *Attorney, Agent, or Firm*—Fay, Sharpe, Fagan, Minnich & McKee, LLP

(57) ABSTRACT

An electric rotary machine comprises a cylindrical pole tooth ring and a plurality of salient poles each including a pole tooth. The salient poles are each positioned and fixed such the pole tooth makes firm contact with the pole tooth ring by means of each of a plurality of mechanisms, which are arrayed circumferentially on the pole tooth ring, and which each comprise bend-ups adapted to be elastically deformed when the pole tooth is fitted into the mechanism.

4 Claims, 10 Drawing Sheets

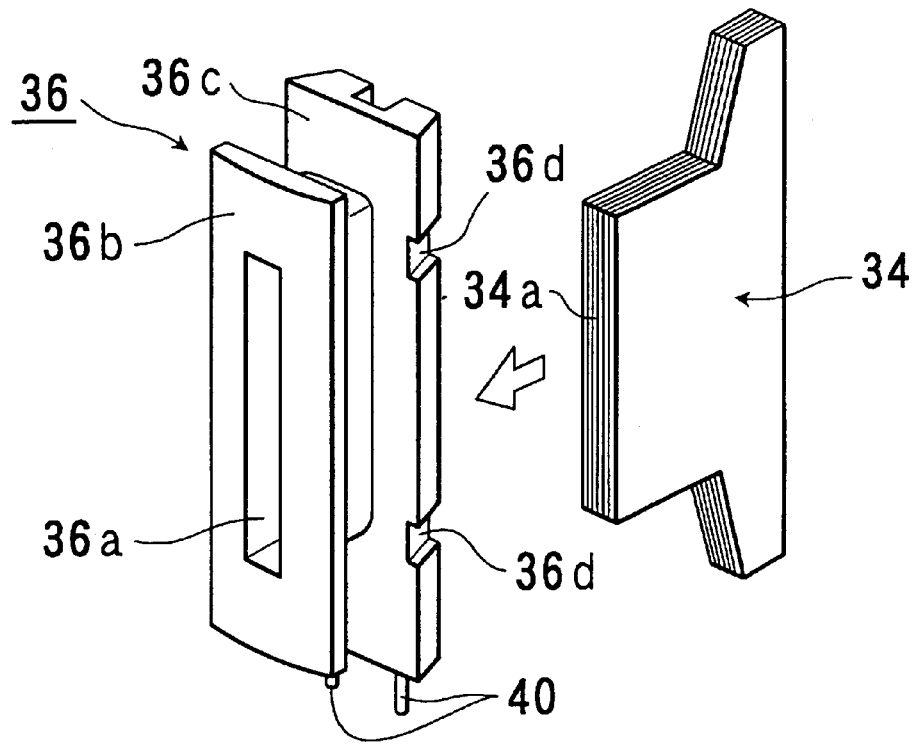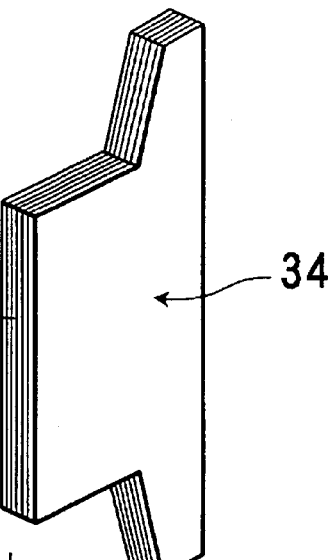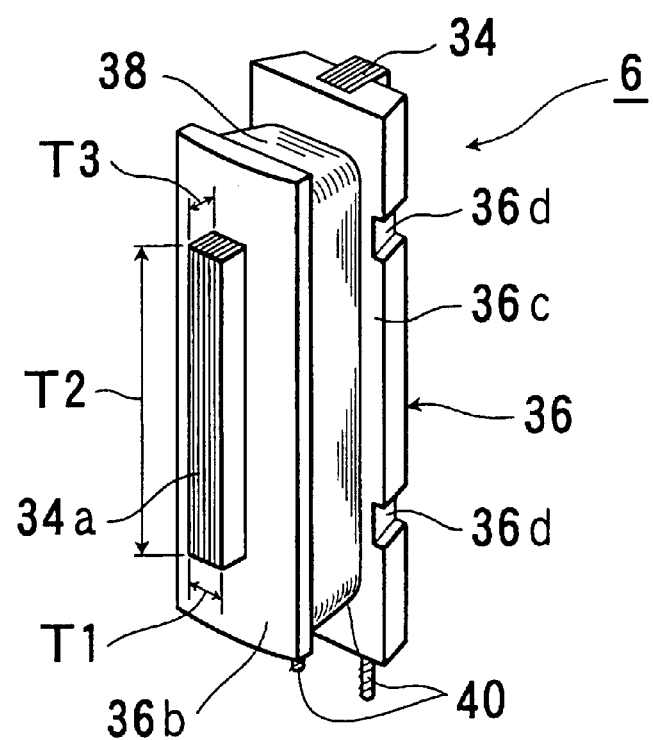

US 6,717,319 B2

ELECTRIC ROTARY MACHINE WITH ARMATURE OF DISCRETE SALIENT POLE STRUCTURE

BACKGROUND OF THE INVENTION

1. Field of the Invention

The present invention relates to an electric rotary machine (hereinafter referred to as "rotary machine," or occasionally "motor" as appropriate), and more particularly to a radial gap type rotary machine comprising an armature with independent salient poles.

2. Description of the Related Art

In a conventional rotary machine including an armature structured such that a plurality of ring-shaped yoke pieces, which are made of a soft magnetic plate, such as a silicon steel plate, and which each have a plurality of pole tooth portions radially protruding, are stacked in the axial direction, since each of the ring-shaped yoke pieces is punched out integrally with the plurality of pole tooth portions as a single piece (the armature composed of the ring-shaped yoke pieces thus structured is hereinafter referred to as "integral armature" as appropriate), pole teeth each composed of a stack number of pole tooth portions are not partitioned structurally and therefore a resultant armature will have superior magnetic efficiency (low reluctance). However, in a small rotary machine, since a wire is usually wound directly on each of the pole teeth, the integral armature makes the winding operation troublesome, and extremely troublesome when the rotary machine is of inner rotor type. As a result, the winding operation takes a long time, and the winding incurs unsatisfactory space factor as well. And, due to the flyer-winding involved in this case, the wire is subject to torsional stress during the winding operation, thereby failing to ensure reliability of the winding area.

Under the circumstances above described, a rare earth magnet having high energy product has been developed recently, and the structure of a rotary machine can be reviewed by means of magnetic circuit analysis using a computer. This works to enable a rotary machine with an armature of discrete salient pole structure (this armature is hereinafter referred to as "discrete armature" as appropriate) to obtain requisite motor characteristics. The rotary machine with the discrete armature may give some undesired increase in reluctance but offers great advantages of easier winding operation and increased space factor of winding to override the disadvantageous increase in reluctance. From this, it is now realized that the rotary machine with the discrete armature produces higher performance and is manufactured less expensively on the whole, and there is a growing demand for the discrete armature.

One example of the discrete armature is manufactured such that pole tooth portions are dismembered off its main body portion of an integral armature, a wire is wound around each of the dismembered pole tooth portions thereby constituting each salient pole portion, and that the pole tooth portions each with a wire wound therearound, namely, the salient pole portions are rejoined to the main body portion by laser-welding, or the like.

The armature thus structured, however, has a disadvantage that the integral armature has to be first sectioned and later reassembled, thereby requiring an additional time. Also, when the pole tooth portions each with a winding (namely salient poles) are rejoined to the main body portion, the stack layers of the both portions have to be matched with each other, and therefore it is required that respective portions be held together by a well-maintained tool and surely welded plate by plate for ensuring precision, which results in decreased workability. And, joints (welded portions) deteriorate significantly in mechanical strength and magnetic characteristics To overcome the above described problems, the present inventors disclosed in Japanese Patent Application Laid-open No. 2001-238377 a radial gap type rotary machine comprising: a discrete armature including a plurality of discrete salient poles and a cylindrical pole tooth ring for positioning and fixing the salient poles, thereby connecting magnetically and mechanically the salient poles to one another; and a cylindrical stator ring adapted to decrease leakage flux resulting from magnetic discontinuity.

FIG. 1 shows a pole tooth ring 150 of the rotary machine disclosed in the above mentioned Japanese Patent Application Laid-open No. 2001-238377. The pole tooth ring 150 is of a soft magnetic steel plate and is produced, for example, by the process of drawing. The pole tooth ring 150 has a plurality (six in the figure) of slits 150a shaped substantially rectangular, extending axially (in parallel to a shaft of a rotor) from its one axial end beyond its halfway point and arrayed circumferentially at even intervals. The slits 150a do not necessarily have to be arrayed at even intervals.

Pole teeth of salient poles are fitted into respective slits 150a, whereby the salient poles are appropriately positioned. And, a stator ring made of a steel plate in a hollow-cylindrical configuration is disposed over the pole tooth ring 150, thereby forming a magnetic circuit.

The rotary machine disclosed in the above Japanese Patent Application Laid-open No. 2001-238377 has the following problem. The slits 150a are produced by punching, so their width is determined to the dimension of the punching die and comes out with very little variation. On the other hand, the pole teeth to be fitted into the slits 150a are produced by stacking magnetic steel plates, and the thickness of each of the plates stacked adds up to the thickness of the pole tooth, thus the variation of the pole tooth thickness can be as large as the variation of one plate thickness multiplied by the stack number. Accordingly, it can happen that the condition of contact between the side wall of the slit 150a and the pole tooth is not kept constant.

For example, in case of a rotary machine with a diameter of 42 mm, the variation of the slit width is ±0.03 mm, while the variation of the pole tooth thickness is gained by multiplying ±0.02 mm (the variation of each plate with a thickness of 0.5 mm) by 7 (the stack number), amounting to as large as ±0.14 mm. This large variation sometimes makes it impossible for the pole tooth to fit into the slit, or causes the pole tooth to make unstable contact or even no contact with the side wall of the slit with regard to the slit width direction.

If the pole tooth does not make stable contact with the side wall of the slit, that is, the pole tooth ring, the magnetic circuit at the stator is not stable, thereby causing the rotary machine to rotate unstably generating vibrations and noises This renders the rotary machine unsuitable for precision instruments.

SUMMARY OF THE INVENTION

The present invention has been made in view of the above described problems, and its object is to provide a rotary machine, in which a stable contact is ensured between a pole tooth ring and pole teeth thereby obtaining stable motor characteristics.

In order to achieve the above object, according to a first aspect of the present invention, a rotary machine comprises: a cylindrical pole tooth ring; and a plurality of salient poles each including a pole tooth, wherein the pole tooth ring is provided with a plurality of mechanisms each comprising at least two bend-ups, and the salient poles are each positioned and fixed such that the pole tooth is fitted into the mechanism, specifically, fitted between the bend-ups which are adapted to be elastically deformed when receiving the pole tooth fitted into the mechanism.

According to a second aspect of the present invention, in the rotary machine of the first aspect, the bend-ups are configured so as to generate elasticity acting against the pole tooth when the pole tooth is fitted into the mechanism.

According to a third aspect of the present invention, in the rotary machine of the second aspect, the mechanism further comprises at least one pole tooth stopper, and the at least one pole tooth stopper and the at least two bend-ups in combination hold fixedly the pole tooth.

According to a fourth aspect of the present invention, in the rotary machine of the third aspect, the at least one pole tooth stopper generates elasticity.

Accordingly, in the rotary machine of the present invention, when the pole tooth is fitted into the mechanism, the variation of the pole tooth thickness can be absorbed by the elasticity provided at the bend-ups and the pole tooth stopper, whereby a stable contact is ensured between the pole tooth ring and the pole teeth of the salient poles, and therefore a stable magnetic circuit is formed ensuring stable motor characteristics.

BRIEF DESCRIPTION OF THE DRAWINGS

FIGS. 4A and 4B in combination constitute an exploded perspective view of a salient pole (omitting a coil) shown in FIGS. 2 and 3, respectively showing a bobbin and a pole tooth;

FIG. 5 is a perspective view of the salient pole (assembled including a coil) explained in FIGS. 3A and 3B;

FIGS. 6A to 6C in combination constitute an exploded perspective view of an armature assembly of the rotary machine of the first embodiment, wherein FIG. 6A shows a salient pole assembly with six salient poles arranged radially at even angle intervals of 60 degrees such that their bobbin flanges are in contact with one another, FIG. 6B shows a pole tooth ring, and FIG. 6C shows a stator ring;

DESCRIPTION OF THE PREFERRED EMBODIMENTS

Preferred embodiments will hereinafter be described in detail with reference to the drawings. Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

Figure 1:
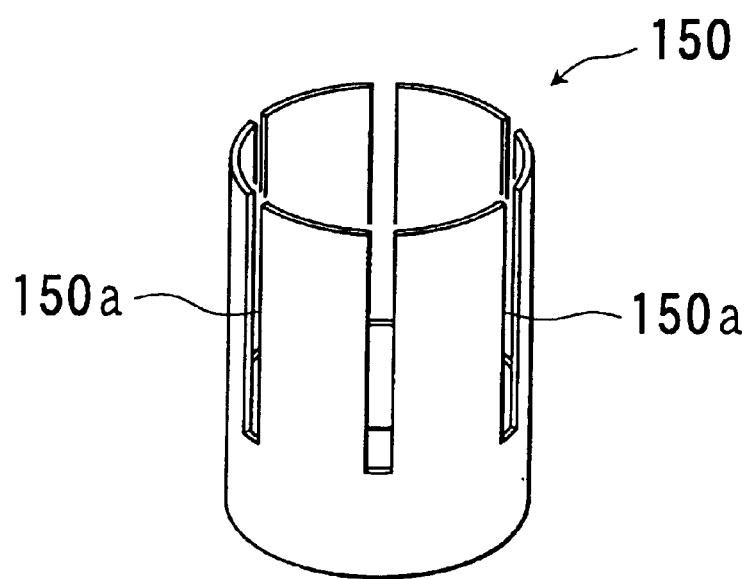
FIG. 1 is a perspective view of a pole tooth ring of a conventional rotary machine.
Figure 2:
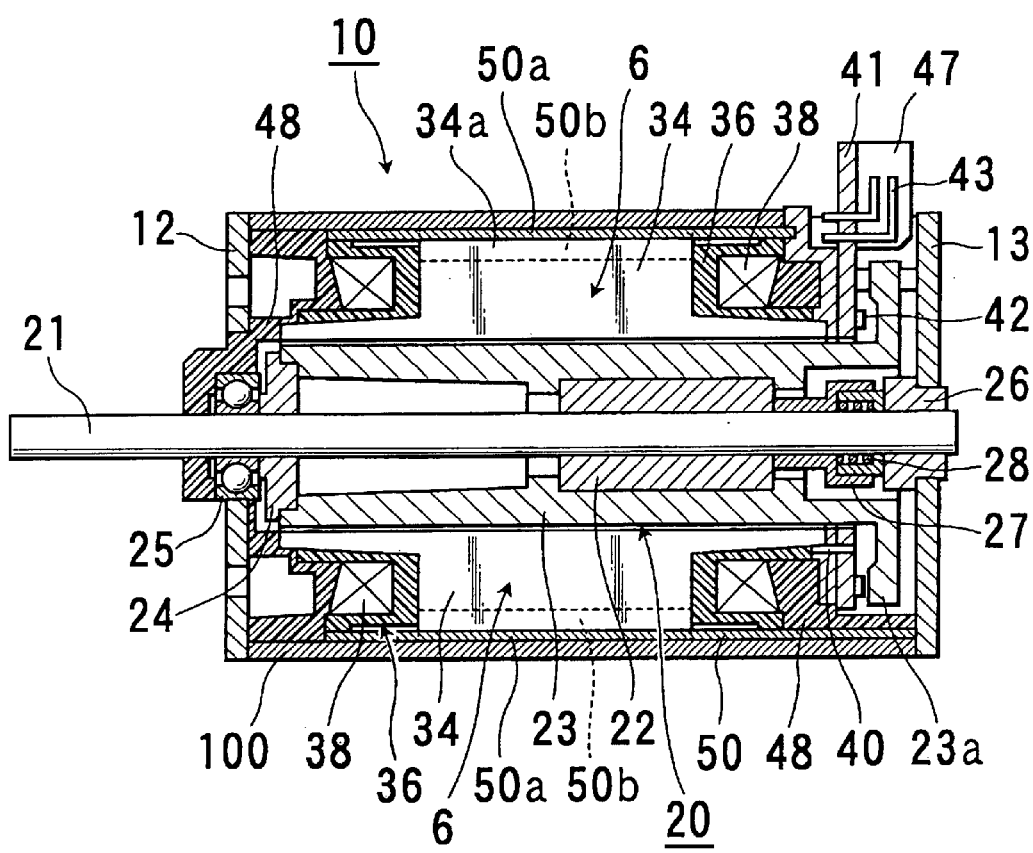
FIG. 2 is a cross-sectional view of a rotary machine according to the first embodiment of the present invention taken along its axial direction.
Figure 3:
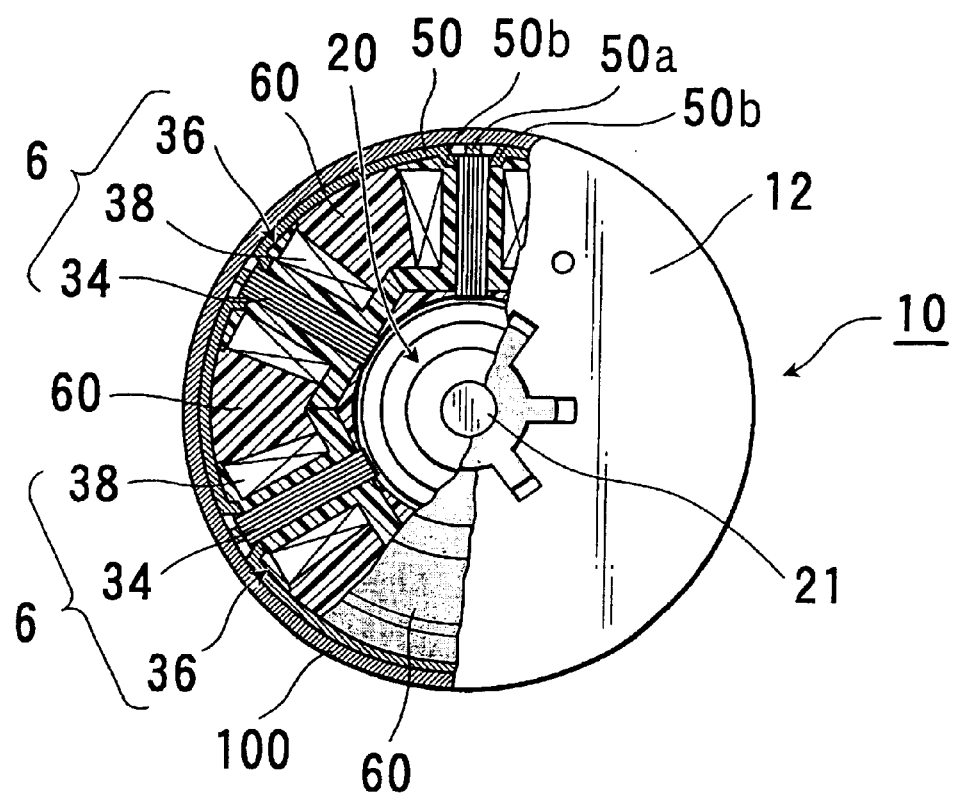
FIG. 3 is a cross-sectional view of the rotary machine of FIG. 2 taken along its radial direction.

FIGS. 2 and 3 show a structure of a three-phase inner rotor type brushless DC motor with six salient poles and eight rotor magnetic poles, as an embodiment of the present invention, wherein illustrated are: salient poles 6, an armature assembly 10, flanges 12 and 13, a rotor assembly 20, a shaft 21, a sleeve 22, a rotor field magnet 23, a rotor position detecting magnet 23a, a spacer 24, a ball bearing 25, a sleeve bearing 26, a preload spring holder 27, a preload spring 28, pole teeth 34, pole tooth end portions 34a, bobbins 36, magnet wires 38, terminal pins 40, a printed circuit board 41, a Hall sensor 42, connector terminals 43, a connector 47, a molding resin 48, a cylindrical pole tooth ring 50, pole tooth stoppers 50a, bend-ups 50b, and a cylindrical stator ring 100.

The embodiment here refers to a so-called integrally resin-molded armature assembly structured such that a resin is filled inside an armature assembly except a portion where a rotor field magnet is received.

The brushless DC motor generally comprises: the armature assembly 10; the two flanges 12 and 13 arranged respectively at both axial ends of the armature assembly 10; and the rotor assembly 20 rotatably disposed inside the armature assembly 10.

The armature assembly 10 includes: the stator ring 100 as its outer circumference; the pole tooth ring 50 disposed on the inner circumferential surface of the stator ring 100; and six salient poles 6 disposed inside the pole tooth ring 50 at an even angle interval of 60 degrees and extending radially.

The structure of each of the salient poles 6 will be described below with reference to FIGS. 4A, 4B and 5. In FIGS. 4A, 4B and 5, the constituting parts same as or corresponding to those shown in FIGS. 2 and 3 have the same reference numbers.

The salient poles 6 are each structured such that the pole tooth 34 (FIG. 4B) composed of seven surface-insulated magnetic steel plates stacked on one another, each plate having a thickness of 0.5 mm and punched out to be substantially T-shaped, has its T-letter's vertical (oriented horizontal in the figure) bar portion inserted into a rectangular hole 36a of the resin bobbin 36 (FIG. 4A) and such that the wire 38 is wound on the bobbin 36 between the bobbin flanges 36b and 36c as shown in FIG. 5.

The substantially T-shaped pole tooth 34 has a thickness T1, and the vertical bar portion thereof has a width T2 and has a length such that it protrudes by a dimension T3 overall from the surface of the bobbin flange 36b. The wire 38 has its both terminations bound around respective terminal pins 40 attached to the lower end of the bobbin flange 36c. The bobbin flange 36c has, on each of its both sides, two notches 36d, 36d forming resin injection holes 37 (to be described later: see upcoming FIG. 6A) for injecting the molding resin 48 through.

The pole tooth 34 may alternatively be made of a soft magnetic material such as a ceramic molding formed by sintering a soft magnetic powder, and a metallurgic molding formed by sintering a soft magnetic material composed of micro-powder of surface-insulated pure iron. The pole tooth 34 made of a different soft magnetic steel material containing Fe—Ni—Cr series steel not only keeps a high permeability but also has a relatively high electrical resistance thereby reducing its eddy current loss, and at the same time is free from corrosion without rustproof treatment thus being suitable for use in extreme environments such as automotive application.

Figure 6A:
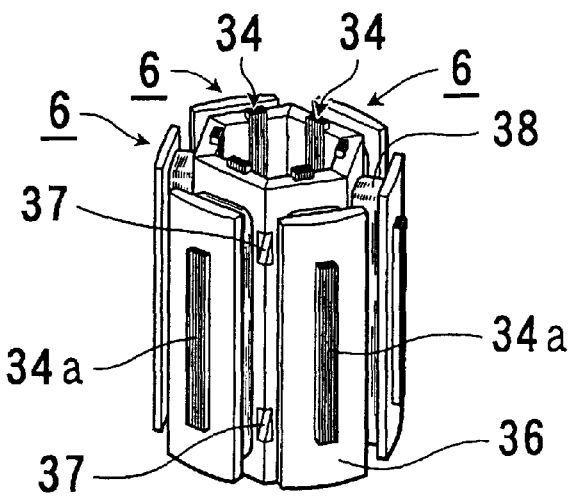
Figure 6B:
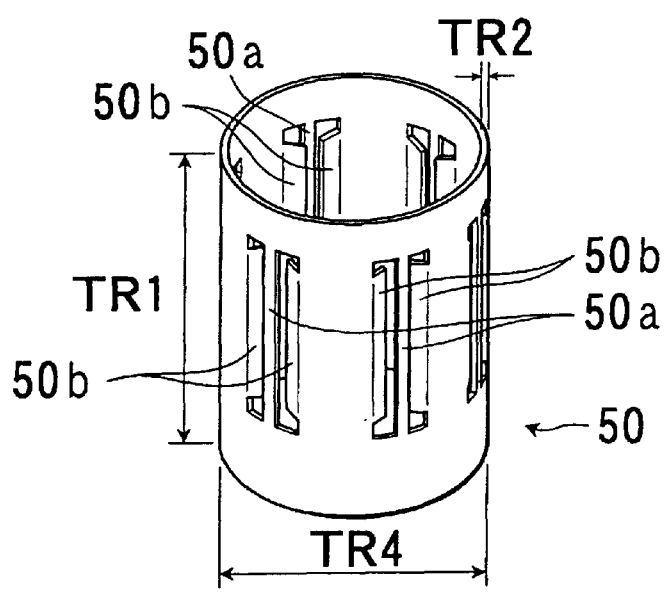
Figure 6C:
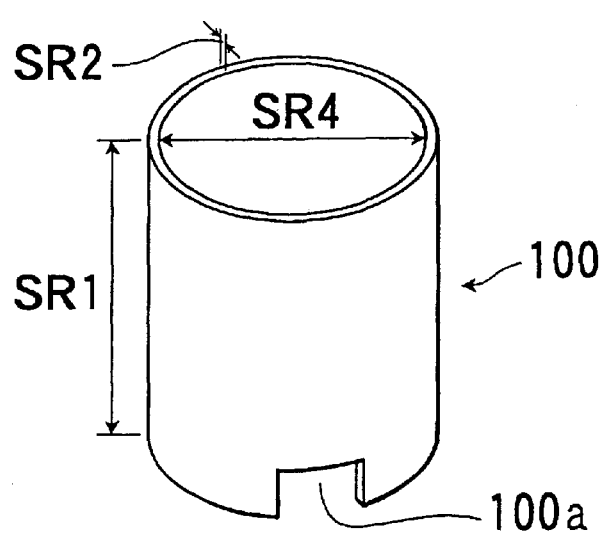

The structure of the armature assembly 10 will be described below with reference to FIGS. 6A to 6C. In FIGS. 6A to 6C, the constituting parts same as or corresponding to those shown in FIGS. 2 to 5 have the same reference numbers.

Referring to FIG. 6A showing a salient pole assembly (six of the salient poles 6), two of the aforementioned resin injection holes 37 are formed at every interface between two adjacent bobbin flanges 36c, 36c (see FIGS. 4 and 5) laterally butting each other, such that two notches 36d, 36d (see FIGS. 4 and 5) formed on the butting surface of one bobbin flange 36c of the two oppose respectively two notches 36d, 36d formed on the butting surface of the other bobbin flange 36c of the two.

FIG. 6B shows the aforementioned pole tooth ring 50 for housing the salient pole assembly shown in FIG. 6A. The pole tooth ring 50 is a hollow cylinder of a soft magnetic steel plate, is produced by, for example, drawing process, and is provided with a plurality of mechanisms for positioning and fixing the salient poles 6 as described later.

FIG. 6C shows the aforementioned stator ring 100 for housing the above described pole tooth ring 50 with the salient pole assembly lodged therein. The stator ring 100, unlike the tooth ring 50, is not provided with positioning mechanisms nor fixing mechanisms, and has an inner diameter SR4 equal to or slightly larger than an outer diameter TR4 (see FIG. 6B) of the pole tooth ring 50, so that the pole tooth ring 50 with the salient pole assembly is duly fitted into the stator ring 100. Needless to say, in case of an outer rotor type motor, a stator ring is disposed inside a pole tooth ring.

The stator ring 100 has a length (axial dimension) SR1 equal to or slightly larger than a length TR1 of the pole tooth ring 50, so that the pole tooth ring 50 is housed completely in the stator ring 100. Thus, the stator ring 100 prevents exposure of the mechanisms for positioning and fixing the salient poles, and completely covers the magnetic discontinuity thereby significantly reducing magnetic leakage flux. This naturally enhances also the product appearance quality and decency.

The stator ring 100 has a wall thickness SR2 larger than a wall thickness TR2 of the tooth ring 50 because the flanges 12 and 13 (see FIG. 2) are welded respectively to the both ends of the stator ring 100. The wall thickness SR2 of the stator ring 100, however, should be minimized insofar as the flanges 12 and 13 can be duly welded to the stator ring 100. The stator ring 100 is provided with a cutaway 100a for accommodating the connector 47 (see FIG. 2).

Figure 7A:
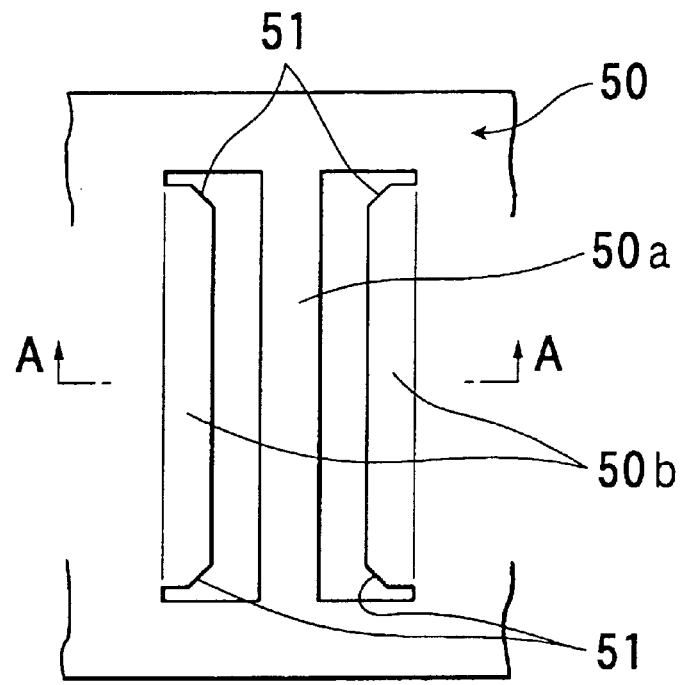
FIGS. 7A and 7B are views of a pole tooth stopper and bend-ups of the pole tooth ring shown in FIG. 6B, respectively showing its top plan view, and its cross-sectional view along A—A in FIG. 7A with a pole tooth end portion fitted between the bend-ups.

The pole tooth ring 50 will be described with reference to FIGS. 6B, 7A and 7B. The pole tooth ring 50 has a plurality (six in this embodiment) of mechanisms arrayed circumferentially at even intervals, and adapted to position and fix the salient poles 6. The mechanisms each comprise a pole tooth stopper 50a shaped oblong and extending axially (parallel to the shaft 21 (see FIG. 2)), and two bend-ups 50b shaped oblong, and oriented parallel to the pole tooth stopper 50a, each bend-up being located at each of both sides of the pole tooth stopper 50a. The mechanisms do not necessarily have to be arrayed at even intervals as described above, but may be arrayed at irregular intervals for the purpose of controlling cogging torque.

The two bend-ups 50b are adapted to elastically sandwich the end portion 34a of the pole tooth 34 of the salient pole 6 thereby circumferentially positioning and fixing the salient pole 6 which is radially positioned and fixed by means of the pole tooth stopper 50a. The bend-up 50b is formed such that a part of the tooth ring 50 is punched and bent up along a predetermined line as shown in FIG. 6B, in which process the pole tooth stopper 50a is concurrently formed.

The pole tooth stopper 50a and the bend-ups 50b are dimensioned and configured such that the pole tooth stopper 50a makes good contact with the end face of the end portion 34a of the pole tooth 34 and that the bend-ups 50b generate good elasticity thereby fixedly holding the end portion 34a.

Figure 7B:
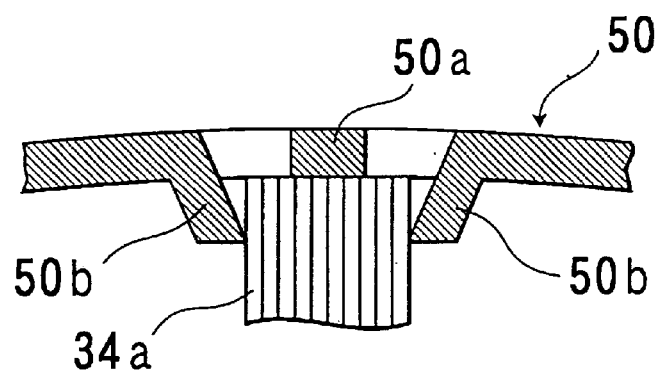

The six salient poles 6 independently prepared are each duly positioned and fixed to the pole tooth ring 50 such that the end portion 34a of the tooth pole 34 is fitted between the two bend-ups 50b with its end face stopped by and in contact with the pole tooth stopper 50a as shown in FIG. 7B. Here, the bend-up 50b may have chamfered corners 51 as shown in FIG. 7A so that the end portion 34a of the pole tooth 34 can be fitted between two bend-ups 50b without difficulty. Then, the stator ring 100 of a soft magnetic steel plate is placed so as to house the pole tooth ring 50, thereby forming a magnetic circuit.

Figure 8A:
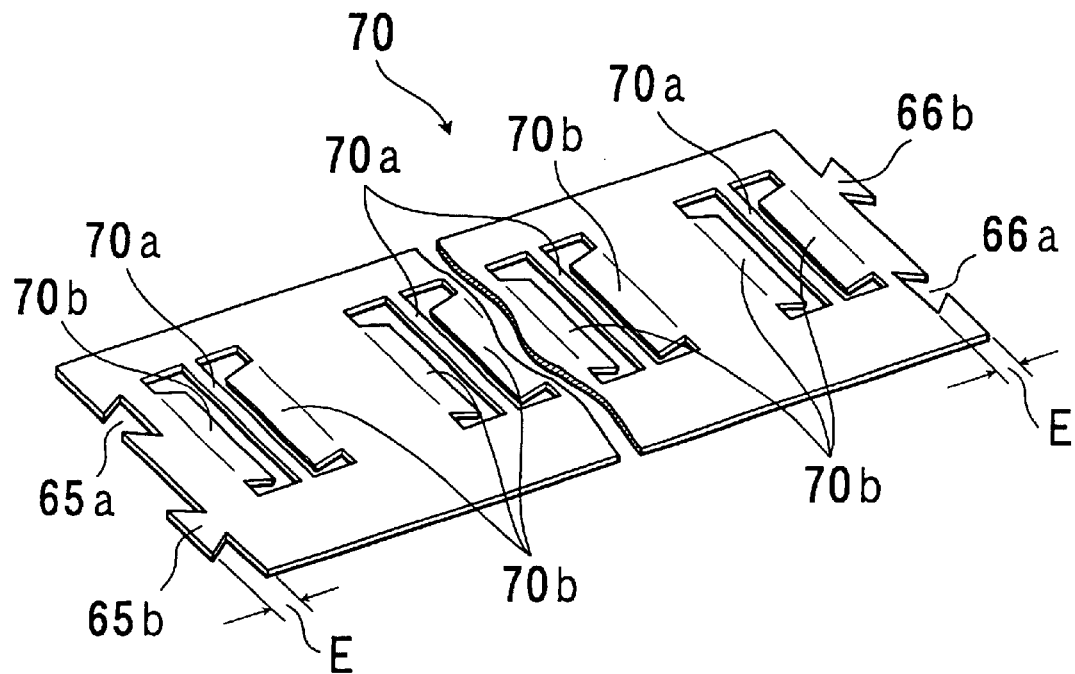
FIGS. 8A and 8B are perspective views of a pole tooth ring of a rotary machine according to the second embodiment of the present invention, respectively showing the pole tooth ring as before and after assembly.
Figure 8B:
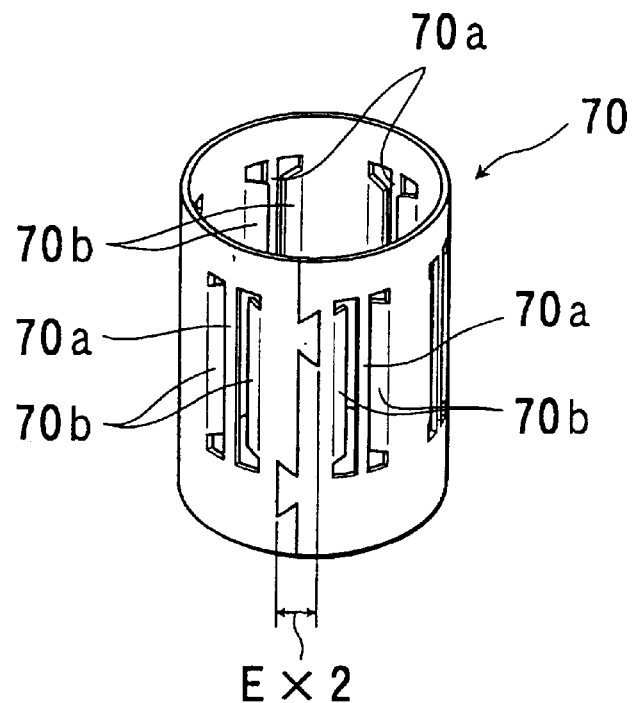

A second embodiment of the present invention will be described with reference to FIGS. 8A and 8B. Referring to FIG. 8A, a soft magnetic steel plate, for example, galvanized, nickelized, or pure-iron plate, has a plurality (six in this embodiment) of mechanisms arrayed at prescribed intervals, and adapted to position and fix the salient poles 6. The mechanisms each comprise a pole tooth stopper 70a, and two bend-ups 70b each located at each of both sides of each pole tooth stopper 70a. The steel plate thus prepared is rolled up to form a pole tooth ring 70 as shown in FIG. 8B. In this embodiment, the sophisticated process of drawing required in the first embodiment is eliminated.

Referring back to FIG. 8A, one end (left end in the figure) of the steel plate is provided with a cutaway 65a with a depth E and a protrusion 65b with a height E, and the other end (right end in the figure) thereof is provided with a protrusion 66b with a height E and a cutaway 66a with a depth E. The steel plate prepared as shown in FIG. 8A is rolled up and the both ends thereof are joined together such that the cutaway 65a engages with the protrusion 66b and the protrusion 65b engages with the cutaway 66a as shown in FIG. 8B, thereby ensuring high precision on the pole tooth ring 70 during assembly process. The cutaways and the protrusions do not have to be shaped as shown in FIG. 8A, but may be shaped otherwise. Also, the both ends of the steel plate may be plain without the mating cutaways and protrusions.

The six salient poles 6 independently prepared are each duly positioned and fixed to the pole tooth ring 70 in the same way as described in the first embodiment.

Figure 9:
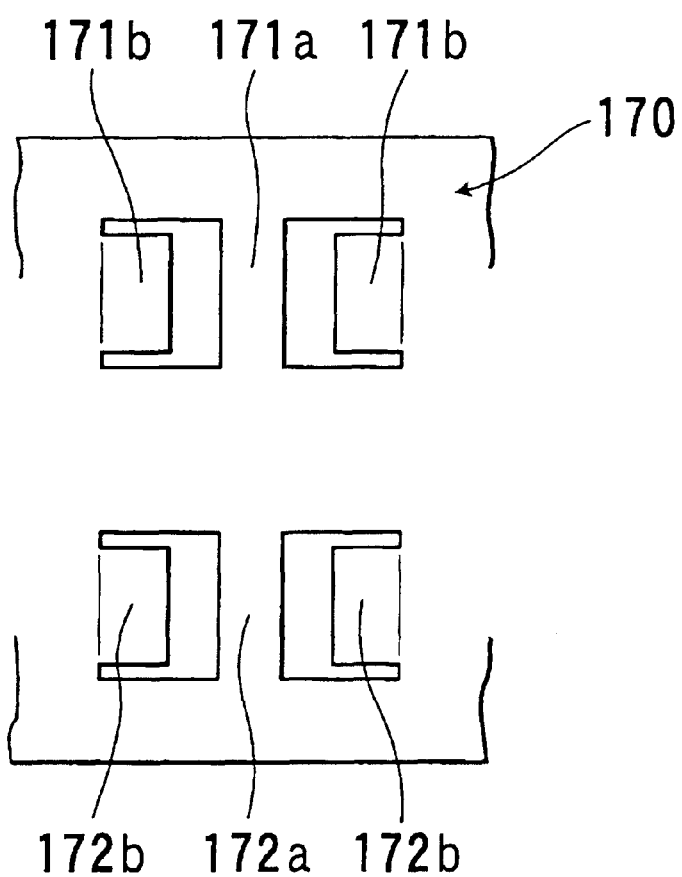
FIG. 9 is a top plan view of a pole tooth ring of a rotary machine according to the third embodiment of the present invention.

A third embodiment of the present invention will be described with reference to FIG. 9. FIG. 9 corresponds to FIG. 7A referred to in describing the first embodiment. A pole tooth ring 170 is provided with a plurality of mechanisms (only one is shown in the figure) for positioning and fixing the salient poles 6. The mechanisms each comprise two pole tooth stoppers 171a and 172a, and four bend-ups 171b, 171b and 172b, 172b. The pole tooth stoppers 171a and 172a are axially (vertically in the figure) aligned to each other, one bend-up 171b and the other bend-up 171b are disposed symmetric with each other about the pole tooth stopper 171a, and one bend-up 172b and the other bend-up172b are disposed symmetric with each other about the pole tooth stopper 172a, whereby the salient poles 6 are each duly positioned and fixed such that the end portion 34a of the pole tooth 34 is fitted between the bend-ups 171b and 171b and between the bend-ups 172b and 172b with its end face stopped by and in contact with the pole tooth stoppers 171a and 172a.

Figure 10A:
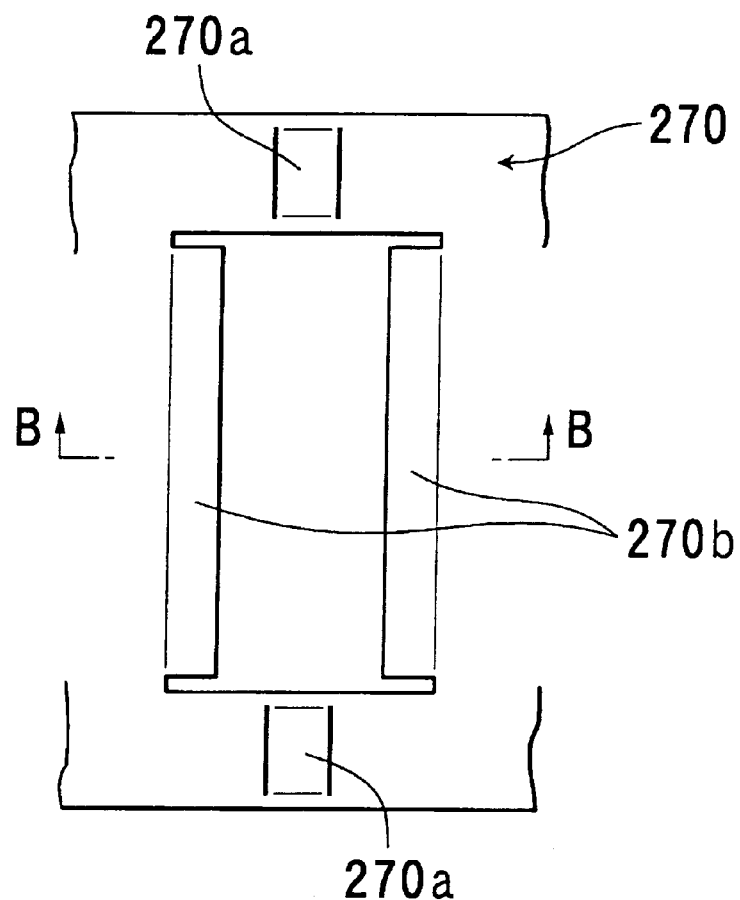
FIGS. 10A and 10B are views of a pole tooth ring of a rotary machine according to the fourth embodiment of the present invention, respectively showing its top plan view, and its cross-sectional view along B—B in FIG. 10A including a pole tooth end portion fitted between bend-ups.
Figure 10B:
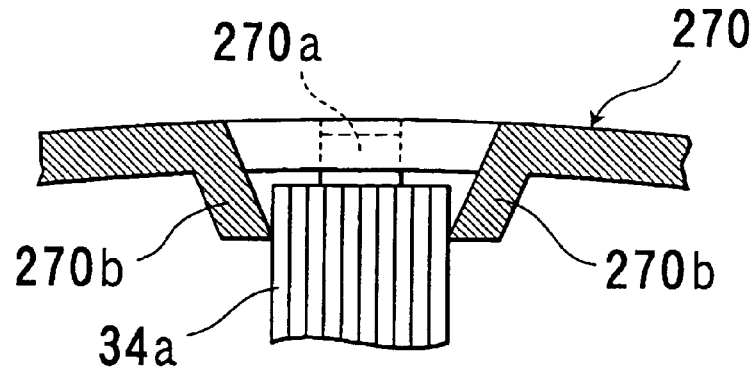

A fourth embodiment of the present invention will be described with reference to FIGS. 10A and 10B, which corresponds to FIGS. 7A and 7B, respectively. A pole tooth ring 270 is provided with a plurality of mechanisms (only one is shown in the figure) arrayed circumferentially, and adapted to position and fix the salient poles 6. The mechanisms each comprise two pole tooth stoppers 270a, 270a, and two bend-ups 270b, 270b as shown in FIG. 10A. The two bend-ups 270b, 270b extend axially (parallel to the shaft 21) in parallel to each other and oppose each other with open space therebetween, and the two pole tooth stoppers 270a, 270a each located at each of the axial ends of the pole tooth ring 270 and axially (vertically in the figure) aligned to each other with the alignment line centering between the two bend-ups 270b, 270b, whereby the salient poles 6 are each duly positioned and fixed such that the end portion 34a of the pole tooth 34 is fitted between the two bend-ups 270b, 270b with its end face stopped by and in contact with the pole tooth stoppers 270a, 270a as shown in FIG. 10B.

The pole tooth stoppers 270a are each formed such that two vertical cuts in parallel are made in the pole tooth ring 270 and a part therebetween is pushed out in the same direction of the bend-ups 270b. The bend-up 270b is formed in the same way as in the preceding embodiments. The pole tooth stoppers 270a and the bend-ups 270b are dimensioned and configured so as to be elastically deformable enough to make firm contact with the end portion 34a of the pole tooth 34 as shown in FIG. 10B when the pole tooth 34 is fitted between the bend-ups 270b and 270b thereby fixing the salient pole 6. The cylindrical stator ring 100 made of steel is placed over the pole tooth ring 270, thereby forming a magnetic circuit.

Figure 11A:
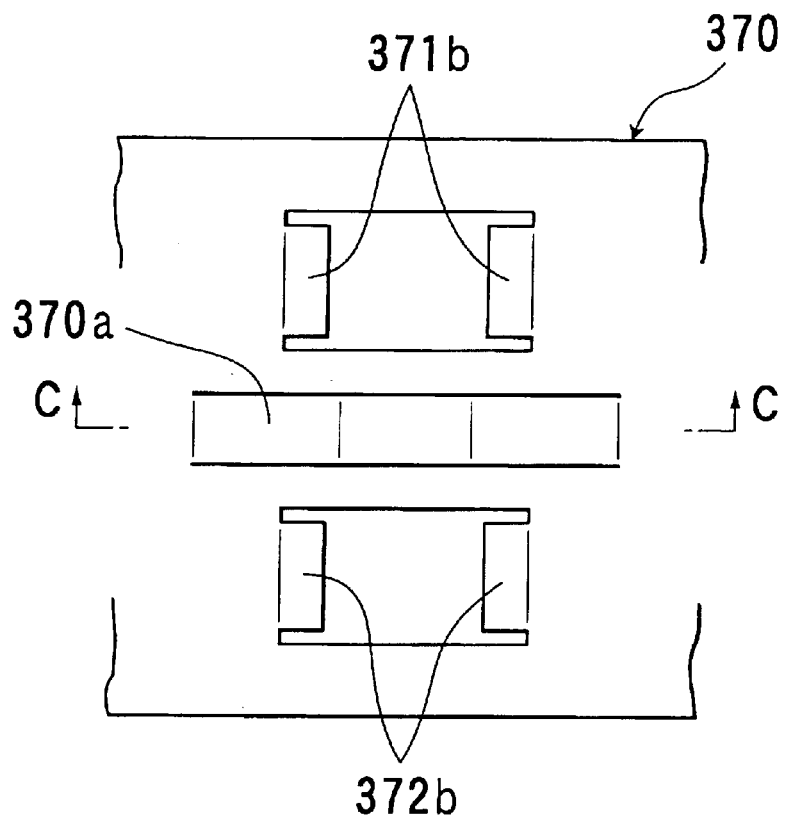
FIGS. 11A and 11B are views of a pole tooth ring of a rotary machine according to the fifth embodiment of the present invention, respectively showing its top plan view, and its cross-sectional view along C—C in FIG. 11A including a pole tooth end portion fitted between bend-ups.

A fifth embodiment of the present invention will be described with reference to FIGS. 11A and 11B, which correspond to FIGS. 7A and 7B, respectively. A pole tooth ring 370 is provided with a plurality of mechanisms (only one is shown in the figure) arrayed circumferentially, and adapted to position and fix the salient poles 6. The mechanisms each comprise a pole tooth stopper 370a and four bend-ups 371b, 371b and 372b, 372b as shown in FIG. 11A. The pole tooth stopper 370a extends circumferentially (horizontally in the figure) at the center of the pole tooth ring 370, and the bend-ups 371b, 371b and the bend-ups 372b, 372b are disposed so as to oppose each other across the pole stopper 370a such that one bend-up 371b is axially (vertically in the figure) aligned to one bend-up 372b, and the other bend-up 371b is axially aligned to the other bend-up 372b.

Figure 11B:
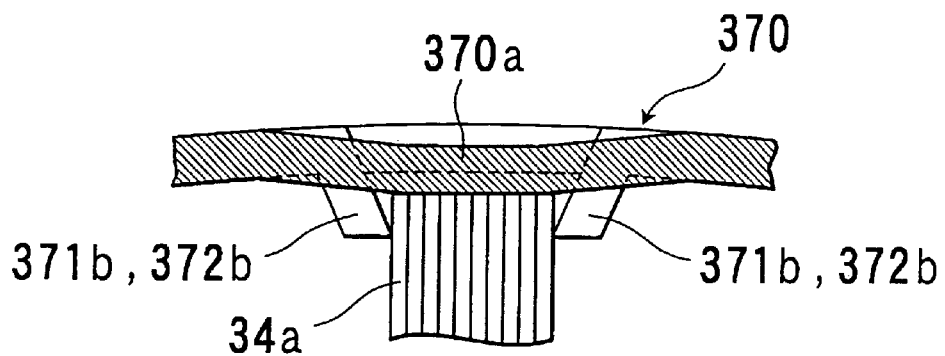

The pole tooth stopper 370a and the bend-ups 371b, 372b are dimensioned and configured so as to be elastically deformable enough to make firm contact with the end portion 34a of the pole tooth 34 as shown in FIG. 11B when the pole tooth 34 is fitted between the bend-ups 371b and 371b and between the bend-ups 371b and 377b thereby fixing the salient pole 6. The cylindrical stator ring 100 made of steel is placed over the pole tooth ring 370, thereby forming a magnetic circuit.

What is claimed is:

1. An electric rotary machine comprising:

a cylindrical pole tooth ring, the pole tooth ring being provided with a plurality of mechanisms, each mechanism comprising at least two bend-ups; and a plurality of salient poles each including a pole tooth, each salient pole positioned and fixed such that the pole tooth is fitted into the mechanism, the at least two bend-ups of the mechanism are elastically deformed when receiving the pole tooth fitted into the mechanism.

2. An electric rotary machine according to claim 1, wherein the at least two bend-ups are configured so as to generate elasticity acting against the pole tooth when the pole tooth is fitted into the mechanism.

3. An electric rotary machine according to claim 2, wherein the mechanism further comprises at least one pole tooth stopper adapted, in combination with the at least two bend-ups, to fixedly hold the pole tooth.

4. An electric rotary machine according to claim 3, wherein the at least one pole tooth stopper generates elasticity.

* * * * *